United States Patent
Lechner, Jr.

[15] 3,682,191
[45] Aug. 8, 1972

[54] APPARATUS AND METHOD FOR SENSING THE POSITION OF A SURFACE

[72] Inventor: Thomas J. Lechner, Jr., Menomonee Falls, Wis.

[73] Assignee: Johnson Service Company, Milwaukee, Wis.

[22] Filed: Aug. 10, 1970

[21] Appl. No.: 62,317

[52] U.S. Cl.................................137/81.5, 73/37.6
[51] Int. Cl.............................F15c 1/20, F15c 3/04
[58] Field of Search........................137/81.5; 73/37.6

[56] References Cited

UNITED STATES PATENTS

| | | |
|---|---|---|
| 3,232,095 | 2/1966 | Symnoski et al......137/81.5 X |
| 3,388,713 | 6/1968 | Bjornsen....................137/81.5 |
| 3,250,285 | 5/1966 | Vockroth, Jr. ............137/81.5 |
| 3,494,257 | 2/1970 | Welk, Jr. et al.......137/81.5 X |
| 3,515,030 | 6/1970 | Boothe ..................137/81.5 X |
| 3,533,542 | 10/1970 | Ziebolz et al. ........137/81.5 X |
| 3,535,916 | 10/1970 | Adams...................137/81.5 X |
| 3,541,839 | 11/1970 | Weber et al. .........137/81.5 X |
| 3,543,779 | 12/1970 | Eckerlin et al. ..........137/81.5 |
| 3,564,373 | 2/1971 | Carpenter.............137/81.5 X |
| 3,025,696 | 3/1962 | Matteson.....................73/37.6 |
| 3,210,987 | 10/1965 | Bruns ..........................73/37.6 |
| 3,213,670 | 10/1965 | MacGeorge.................73/37.6 |

Primary Examiner—Samuel Scott
Attorney—Andrus, Sceales, Starke & Sawall

[57] ABSTRACT

A sensing nozzle is carried by a bellows, pneumatic capsule or like fluid motor and establishes a free stream which engages a surface and establishes a back pressure within the nozzle which is proportional to the distance from the sensing nozzle to the engaged surface. A fluidic impacting stream modulator has an input nozzle connected to the sensing nozzle to establish an amplified output which is coupled to the fluid motor and repositions the sensing nozzle to maintain a constant gap between the sensing nozzle and the surface. A tapered nozzle projecting into a recess creates a signal proportional to the gap at the recess entrance. A pair of nozzles to the opposite sides of an object produces a pair of signals, the difference of which is proportional to the width of the object.

19 Claims, 5 Drawing Figures

FIG_1

FIG_2

FIG_3

INVENTOR.
THOMAS J. LECHNER JR.
BY
Attorneys

Patented Aug. 8, 1972

INVENTOR.
THOMAS J. LECHNER JR
BY
Attorneys

APPARATUS AND METHOD FOR SENSING THE POSITION OF A SURFACE

BACKGROUND OF THE INVENTION

This invention relates to a fluid position-sensing means and particularly to a non-contacting position signal-transmitting device for providing a position-indicating means, a position-responsive control means and the like.

In many commercial applications, the position of an object or surface is detected to provide a monitoring record and/or to provide a control such as a positioning control for a tool with respect to a work member. For example, in machining, welding and other similar work processes, a transducer may be provided to sense the relative relationship of the work and a working tool. The transducer provides an output signal which is interconnected into a tool-positioning control means to maintain a predetermined movement of the work relative to the working tool. Various sensing devices or transducers generally including a work-engaging follower have been employed in the positioning art to generate an error signal which is interconnected to actuate a positioning drive means. Although such systems may provide an improved means for positioning over the alternative manual or presetting control, they generally encounter a proportional offset which limits the accuracy and applicability of such control systems. Thus, the positioning control generally includes a closed servo system having a forward amplifying unit to amplify an error signal and provide an interrelated drive signal for positioning of the work and work tool. Generally, the proportional offset is inversely proportional to the forward loop gain. As the forward loop gain is increased to maintain sensitivity and response characteristics, a possible condition of instability is created which requires a proportional offset to maintain stable operation.

With the mechanical contacting sensors and the like, the direct contact between the transducer and the work or a control template also introduces the usual problems associated with mechanical devices. Further, the mechanical engagement may produce undesirable loading on the sensed object and reduce the accuracy of the tracking. Such mechanical sensoring is also practically impossible for detecting non-self-supporting surfaces.

Thus, although various generally satisfactory position control devices have been employed, they have certain limitations and undesirable features which reduce the usefulness and applicability of the devices in the commercial art.

SUMMARY OF THE PRESENT INVENTION

The present invention is particularly directed to a fluidic position sensor employing a fluid control system responsive to the characteristic of a free stream which engages and detects the position of the object or surface. Generally, in accordance with the present invention, a fluid source or streamforming means is adapted to be connected to a fluid supply such as air, liquid, mixtures thereof and the like. The forming means establishes a free fluid signal which engages the object or surface, the position of which is to be detected or sensed. A signal means is connected to the forming means and particularly to the passageway upstream of the free stream or signal to detect the characteristic of the free stream. Generally, the stream-forming means include a nozzle which establishes a fluid stream, the pressure and flow characteristic of which is proportional to the length of the gap between the nozzle means and the surface being detected. This signal is a fluid signal which is fed back through a suitable amplifying means and provides a closed loop control to a drive motor means to maintain a relative constant position or spacing between the surface and the stream-forming means and thereby provides an accurate transducing of the characteristic or shape of the object or surface by traversing the surface with the signal stream. Thus, even if the characteristic of the sensing is non-linear, the continuous tracking holds the gap essentially constant and thus produces sensing over a small portion of the sensing characteristic to maintain a linear system response as long as the drive means has a linear response. In the broadest aspect of the invention, the sensor may be of any suitable analog means which provides an accurate response over a relatively small movement.

Generally, the amplifying means preferably includes a fluidic amplifier of the impacting stream concept which may be connected to control the motor means if a high pressure signal arrangement is employed. If a low pressure reading type control signal is provided, a power amplifier such as a fluid diaphragm amplifier is interfaced between the output of the fluidic amplifier and the fluid motor means.

For example, the back pressure characteristic of the signal stream means can provide a pressure signal directly into a fluidic amplifier with the output interconnected to control a positioning means for the stream-forming means.

Alternatively, the sensing flow stream can be coupled to a fluidic signal nozzle to provide an aspirating pressure signal coupled to the amplifying section for correspondingly controlling the position relative to the object's surface. The fluid signal sensor in combination with the closed fluid loop system permits extension of the sensing range to correspond to the span of the usual expandable fluid motor means while maintaining the same accuracy.

The use of a fluid signal is highly desirable in essentially eliminating mechanical contact with the object. The fluid-sensing stream can be at a very minimal pressure and thereby minimize loading of the object. This makes the sensing means suitable not only for the usual detecting of solid self-supporting members and the like but also such non-self-supporting surfaces as powders, soft fabrics, liquids and the like.

Although any suitable fluid amplifying device might be employed, fluidic amplifiers based on the impacting modulator concept provide an unusually satisfactory amplifying control for the interface between the signal from the fluidic means and the control. For example, U. S. Pat. No. 3,417,769 to Bjornsen et al discloses a summing impact modulator having an input nozzle to which the sensor signal may be connected as a main stream source. An opposing fixed stream produces an impact position relative to a control orifice with the output providing a pressure error signal for selectively controlling a fluid motor means for positioning of the fluid sensing means.

The summing impact modulator provides the high gain characteristic of the impacting position concept and is particularly desirable in position control because it operates essentially without phase shift and thereby permits a higher loop gain for the positioning system.

The fluid motor means may, for example, be a bellows, piston, a convoluted capsule unit or the like. The convoluted capsule unit provides a particularly desirable motor drive because of the liner response. In the system employing such a fluid motor means, the output pressure is essentially independent of flow because of the regulator characteristic of the high loop gain and thereby provides accurate sensing of the surface. Further, the transduction from motion to pressure is essentially inversely proportional to the pressure modulus of the motor means.

The pressure system can be interrelated to retract the fluid sensing means to a minimum position for removal or positioning with respect to the surface and then, upon command, reestablished to the same relative position. This, then, permits a high degree of repeatability for successive tracking of the same or subsequent surfaces.

Further, by employing a stream with a relatively small cross section, a relatively high frequency response can be established to effectively detect step-type changes in the surface characteristic.

Thus, the present invention provides a highly reliable and non-loading position-sensing and tracking means such that by relative lateral movement, the device can, in essence, traverse the surface of the object and by maintaining an accurate fixed average distance, produce a continuous signal for recording the characteristic of the surface and/or any working tool or the like. Further, the invention can be applied to the conventional back pressure sensors to establish a reference position which, in turn, will provide an interrelated control and output signal from the back pressure sensors.

The present invention can be employed to measure the thickness of a member as by measuring from a fixed reference or in a particularly novel aspect, providing a pair of sensors aligned with diametrically opposite surfaces of the object.

Thus, the present invention provides a positional transmitting device in which the position of a fluidic sensor is established by monitoring of a pressure or flow required to maintain a predetermined relative position. This is obtained by interconnecting an amplified output signal into the fluid motor means for positioning of the sensing means and by the use of a relatively high fluidic loop gain maintaining an essentially constant average distance for all output pressures within the operating range of the apparatus.

The fluidic system provides a very convenient means for retracting of the sensing means and repositioning thereof after proper location with respect to a work surface and thus is particularly adapted to a commercial production. Further, fluidic control systems are not generally adversely affected by various surrounding environments such as noise, electrical signals and the like and thus provide an advantage in certain commercial applications.

BRIEF DESCRIPTION OF DRAWINGS

The drawings furnished herewith illustrate preferred constructions of the present invention which the above advantages and features are clearly disclosed as well as others which will be readily understood from the following description of such embodiments.

In the drawings.

DESCRIPTION OF ILLUSTRATED EMBODIMENTS OF THE INVENTION

Figure 1:
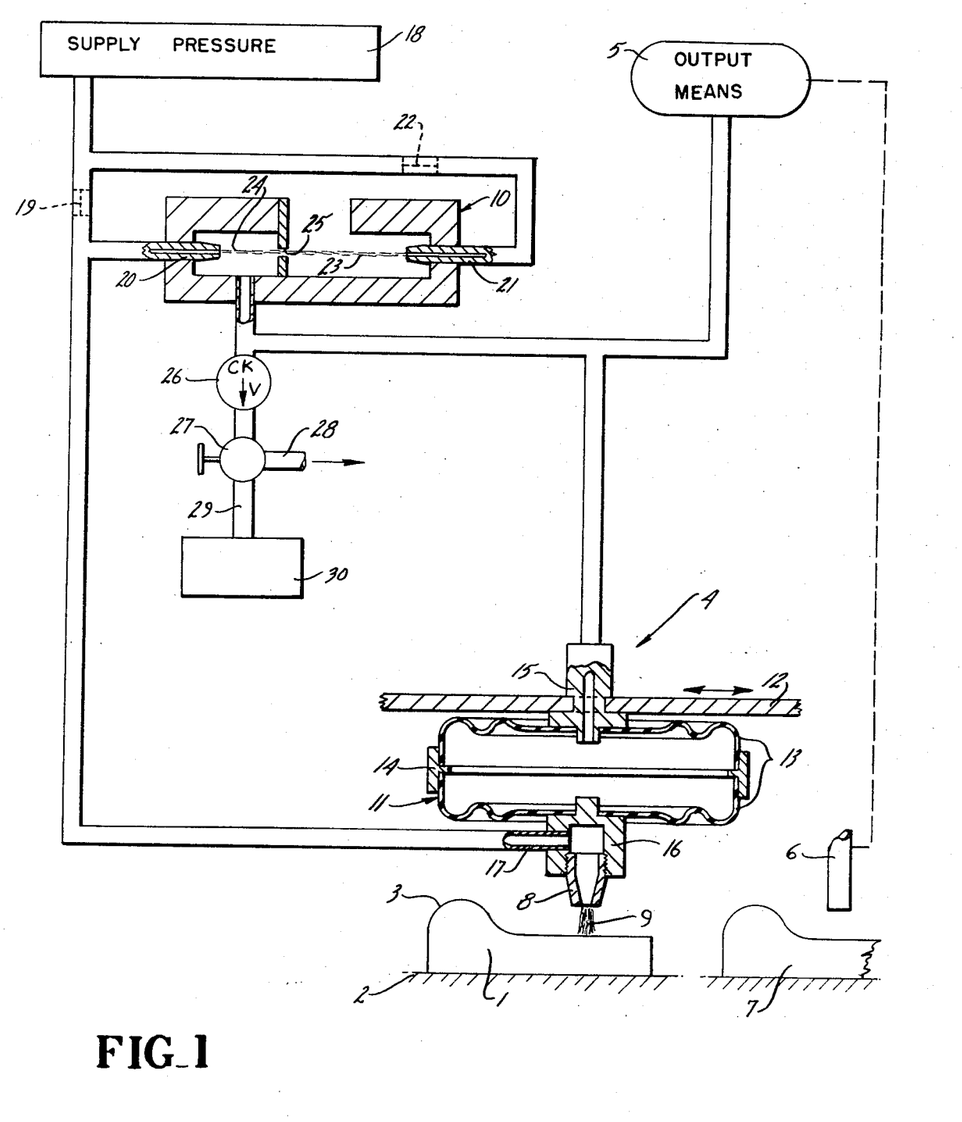
FIG. 1 is a diagrammatic illustration of a position-sensing and control unit employing a back pressure control signal and constructed in accordance with the present invention.

Referring to the drawings and particularly to FIG. 1, a gauge member 1 is shown supported upon a fixed bed 2 and having an upper curved surface 3. A position sensor unit 4 is mounted to traverse the curved surface 3 and establish an output in accordance with the configuration of surface 3. The output is connected to a suitable output means 5, to either record the shape or configuration of surface 3 or to provide an actual controlled output. For example, the output means 5 may control a tool 6 for working of a separate member 7 which is to be shaped in accordance with the surface 3. The sensor unit 4 particularly illustrates a construction of the present invention and provides a fluidic, non-contacting sensing means to provide a continuous output in accordance with the location of the surface 3 with respect to the unit 4, and as a result of a change therein, provides an appropriate control signal.

In the embodiment of the invention of FIG. 1, a sensing jet nozzle 8 forming a part of the unit 4 is located to establish a stream 9 of a suitable fluid such as a gas, liquid or mixture. The stream 9 is advantageously air to permit venting to the atmosphere. Stream 9 is directed toward and into engagement with the surface 3. The nozzle 8 is slightly spaced from the surface 3 to establish a relatively short free stream such that the back pressure in the stream 9 within the nozzle 8 is dependent upon and directly proportional to the length of the gap and spacing of the nozzle 8 from the furface 3 for relatively small changes in the position of the nozzle. This provides a proportionate signal which is fed to a suitable fluid pressure fluidic amplifier, the output of which is connected to actuate the output means 5 and a positioning motor means 11 which interconnect a holder for the nozzle 8 to a suitable support 12. The output of the amplifier 10 is therefore directly related to the position of the nozzle 8 with respect to the surface 3. This output is employed to actuate the output means 5 to record the relative change in the surface gap and to actuate the motor means 11 to simultaneously reposition the nozzle 8 to maintain a constant gap. The support 12 is fixed with respect to the bed 2 to define an accurate reference positioning and is movably mounted to traverse the curved surface 3 and correspondingly positions the nozzle 8. The fluid pressure signal developed by the jet stream 9 correspondingly changes with any change in the stream gap to create the error signal which is fed back to the control system. The pressure of the jet stream may be made of a relatively low level and, consequently, essentially provides a very minimal loading of member 1 and an essentially non-contacting sensing means. Further, the jet stream can be made with a minimal cross section to produce accurate tracking of a line characteristic or the like. Further, although shown as a tracer member for controlling a tool 6 with respect to a separate work member 7, by proper construction and location of the jet stream nozzle, the jet stream can be located immediately adjacent tool 6 and directly trace a work line to maintain the tool in alignment therewith or the like.

More particularly, in the illustrated embodiment of the invention, the nozzle-positioning or motor means 11 is shown as a capsule formed by a pair of oppositely opposed cup-shaped convoluted diaphragms 13, the peripheries of which are spaced slightly from each other and interconnected and sealed to an encircling collar or band 14. The central portions of the opposite faces of the capsule are provided with planar mounting surfaces. An input conduit 15 is secured to the central portion of the upper diaphragm 13 and is fixed within a suitable opening, through a suitable notch construction, to the support plate 12. The conduit 15 is also connected to the fluid amplifier 10 as hereinafter described. A holder and fluid connecting member 16 rigidly secures the nozzle 8 to the center of the lower cup-shaped convoluted diaphragm 13.

The capsule unit 11 provides a highly-desirable type of a positioning control because it establishes a highly linear positioning with pressure in accordance with a fluid input signal which, in the illustrated embodiment, is generated as follows.

The nozzle holder 16 includes a tap or supply connection 17 connected to a main air supply 18 in common with the amplifier 10 through an isolating restrictor 19. Although any suitable negative fluid amplifying gain can be employed in the embodiment of FIG. 1, a summing impact modulator provides an exceptionally satisfactory device because of its high gain characteristic and such a means is diagrammatically illustrated in FIG. 1. Generally, the amplifier 10 includes a first nozzle 20 connected to the supply 18 through the resistor 19 in common with the nozzle connection 17. A second nozzle 21 is located in opposed aligned relationship with the nozzle 20 and connected to the supply 18 through a set point adjustment restrictor 22. The nozzle 21 is also connected directly to the nozzle conduit 17. The fluid supplies thus establish a pair of opposing streams 23 and 24 from the respective nozzles 21 and 20. A control orifice 25 is located in alignment with the two streams and interconnected to the amplifier housing to define an output chamber adjacent the nozzle 20 and a reference chamber adjacent the nozzle 21. The restrictors 19 and 22 reduce the supply pressure to the respective nozzles such that the impact position generally is located inwardly or to the left of a control orifice 25 and within the output chamber defined thereby.

With the impact position within the output chamber to the left of the orifice 25, a maximum output signal is established which is interconnected to the capsule unit 11 and the output means 5 through suitable conduit means.

In the illustrated embodiment of the invention, the output of amplifier 10 is also connected to a reading input control which includes a one-way check valve 26 connected to exhaust the output pressure to a manually-controlled three-way valve 27. The valve 27 normally connects check valve 26 to an exhaust passage or line 28 thereby exhausting the output pressure through the check valve 26 and removing the output signal from the capsule unit 11 as well as the output means 5. When the valve 27 is actuated, it disconnects the discharge side of the valve 26 from the line 28 and connects it to a read line 29 which, in turn, is connected to a suitable relatively high pressure fluid source 30. The output of the source 30 is greater than the maximum output of the amplifier 10 and therefore back biases the check valve 26 to the closed position. The output chamber of the amplifier 10 is therefore connected directly to the output line to the capsule 11 and the output means 5 and transmits a corresponding output pressure.

In operation, the movable sensing means 4 is located with respect to the surface 3 at an initial starting point. The restrictors 19 and 22 are selected or, if adjustable, set to establish a predetermined pressure signal to the respective nozzles 20 and 21 of the amplifier 10 with the nozzle 8 located a predetermined distance from the surface 3. If the desired predetermined distance is not established, the read valve 27 is actuated to read the actual setting. If it is not at the desired setting, the feedback characteristic will be such as to automatically establish the desired initial adjustment. With the read valve 27 closed, the capsule unit 11 and the amplifier 10 are coupled to exhaust or reference. Capsule unit 11 will then retract to the maximum setting and produce a minimal back pressure in stream 9 which is transmitted through the connecting conduit 17 to the nozzle 20. Consequently, the strength of stream 24 will be minimal and full or maximum output is established in the output chamber. When the read valve 27 is actuated to the read position, the exhaust line 28 is closed and the full pressure is transmitted to the capsule unit 11 and to the output means 5. This expands unit 11 and moves nozzle 8 downwardly. As the nozzle 8 moves downwardly, the gap between the nozzle 8 and the surface 3 decreases. This results in an increased back pressure signal within stream 9 which is transmitted to the nozzle 20, thereby causing the impact position to move through the orifice 25. This will reduce the output pressure, thereby relieving the pressure to the output means 5 and the capsule unit 11 until such time as a balanced condition is established.

As the sensing means 4 now moves across the surface 3, the balanced condition will be disturbed in accordance with the changing characteristic of the surface 3. Thus, if the surface rises, as shown immediately to the left of the nozzle 8, the gap and stream length is reduced. This increases the backstream pressure of stream 9, thereby increasing the signal to the nozzle 21. This, in turn, further moves the impact position to the right with respect to the control orifice 25 and further reduces the output pressure of the amplifier 10. The reduced output pressure is recorded in the output means 5, correspondingly positions the tool 6 and simultaneously reduces the pressure to the capsule unit 11 which will retract and carry the nozzle 8 outwardly to reestablish the desired gap.

The feedback through the amplifying means to the positioning means maintains a fixed average distance gap through which the stream 9 flows. By using a high gain amplifying means, the output pressure will be maintained essentially independent of the output flow. The sensing stream 9 may be of any suitable level compatible with the servo loop system. In the embodiment of FIG. 1, a pressure stream of the order of 10 pounds per square inch may be used. To further reduce the sensing pressure level, the loop may be constructed with further stages of amplifying in any desired system, for example, as illustrated hereinafter. Thus, the level may readily be reduced to the order of hundredths of an inch of water to create an essentially minimal force application on the sensed object. This becomes particularly significant where it is desired to sense or control the position of a relatively soft surface such as a fabric, dry powder, liquid or the like. The summing impact modulator shown in FIG. 1 is particularly adapted to this application because of its high gain characteristics and further, the device introduces minimal, if any, phase shift in the signal transmission. This permits relatively high loop gain without interfereing with stability of operation. The illustrated summing impact modulator may be advantagously constructed as shown in the copending application of Bjorn G. Bjornsen and Louis D. Atkinson entitled "Common Supply for Opposing Jet Fluidic Device" which was filed on the same day as this application and assigned to a common assignee. The fluidic amplifier 10 with its input control provides a very convenient means for retracting of the sensing unit to permit removal and insertion of parts while, at the same time, providing an accurate repeatable repositioning of the sensing means with respect to the gauge surface or bed 2. This maintains a very high degree of tracking repeatability and will, therefore, maintain accurate production control.

The repositioning control concept of the present invention maximizes the span of movement which can be detected to that of linear bellows and capsule devices without any significant loss in accuracy. Thus, generally, back pressure sensors have been restricted to detecting total changes in the order of 0.006 inches. Linear bellows and capsules are readily available having a total linear span of between 0.050 to 0.100 inches. The present invention with the interconnected amplification and feedback control signal permits the use of the maximum span where desired or necessary.

In summary, the back pressure sensing means provides a signal which is amplified and inverted and this amplified signal is applied to reposition means in the necessary direction with respect to the sensed object to reduce the error signal and maintain a desired average distance. By employing a relatively high loop gain and a linear reciprocal relationship between the error signal and the position of the sensing nozzle 8, the distance between the sensor unit 4 and the sensed object or surface 3 is essentially constant over all output pressures. Back pressure sensing devices are typically sensitive in the order of two pounds per square inch per 0.001 inches. Such a sensitivity combined with even relatively low fluidic gain devices of the order of 600 or the like will establish positional errors of less than 0.000010 of an inch over a 12 pounds per square inch output range of the amplifier. Fluidic systems such as disclosed herein are particularly stable systems because of the low hysteresis and the high frequency response of the fluidic elements. By proper design, a positional offset which is less than ten millionths of an inch can be established over the full output span of the drive means. This would produce a positional error of less than 0.02 per cent for a bellows span of 0.050 inches and a variation in pressure of 3 to 15 pounds per square inch. The system error is therefore related to and essentially dictated by the error of the drive means 11.

Figure 2:
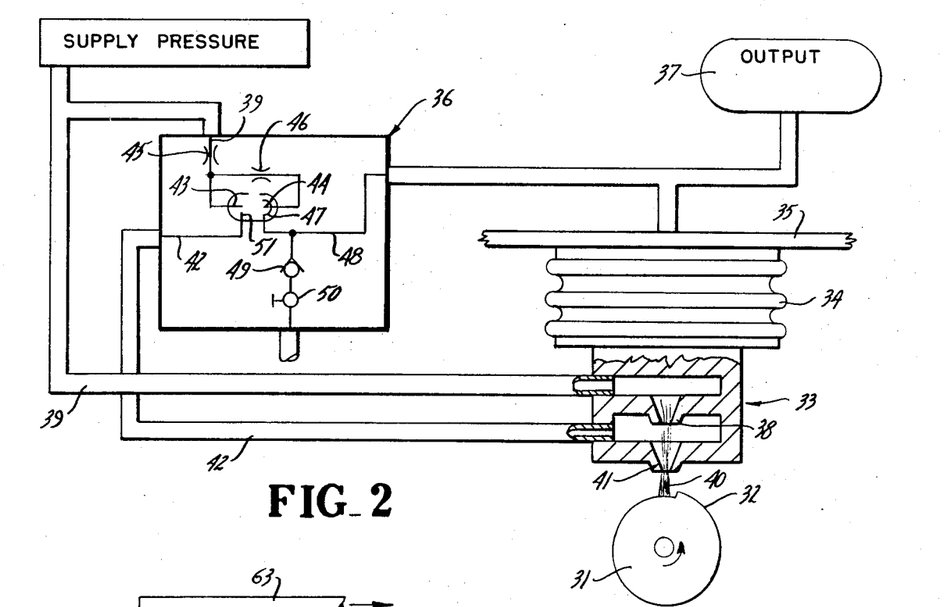
FIG. 2 is a diagrammatic illustration showing a rotary element position fluidic sensing device constructed in accordance with the present invention wherein an aspirating pressure control sensor is used to generate an error signal.

In FIG. 2, a non-contacting rotation or angle-sensing transmitter is illustrated employing an aspirating fluid sensor control nozzle. Generally, in FIG. 2, a rotatable element or drum 31 includes a spiral peripheral surface 32. The drum 31 is shown rotatable about a horizontal axis. A sensing nozzle unit 33 is located immediately above the periphery of the rotatable element and interconnected through a suitable motor means shown as a bellows 34 to a fixed support 35. The nozzle unit 33 is thus positioned with respect to the surface in accordance with the expansion and contraction of the bellows 34 similar to the action of the capsule unit 11 of FIG. 1. The bellows 34 is shown as one possible alternative positioning motor means and is connected to the output of a suitable negative gain pressure amplifier 36 in common with a recording device 37 such as a strip chart, a gauge or the like.

In the embodiment of FIG. 2, the nozzle unit 33 includes an aspirating pressure sensor which includes a fist main stream-forming nozzle 38 connected to a pressure fluid supply through a suitable conduit 39. The nozzle 38 establishes a predetermined stream 40 which is directed downwardly into engagement with the spiral surface of the drum 31. The stream passes downwardly through an aspirating nozzle 41 which is aligned with and secured to the underside of the nozzle 38 to define an aspiration chamber connected by a conduit 42 as an input to the amplifier 36.

The illustrated fluid amplifier is schematically shown as a transverse impact modulator. A pair of opposed nozzles 43 and 44 are connected through a common restrictor 45 to the supply line 39. A pressure-dropping restrictor 46 is inserted in the line to the dependent nozzle 44. A collector 47 is provided surrounding the dependent nozzle 44 and is interconnected via an output line 48 to the bellows 34 and the output pressure recorder 37.

As in FIG. 1, a check valve 49 and a manual control valve 50 are connected to the output line 48 to selectively exhaust the output pressure to provide a controlled reading and retraction of the sensing head. Thus, with the valve 50 connected to exhaust the output 48, the output pressure to the bellows is minimal and, consequently, will retract to permit insertion and removal of the rotating drum or the like. With the valve 50 open, a high pressure signal is applied to the check valve 49 to close the check valve and thereby transmit the output pressure to the bellows.

A transverse signal nozzle 51 is located adjacent and perpendicular to the output of the independent nozzle 43 of the modulator. The nozzle 51 thus establishes a stream, not shown, transverse to that of the main stream to cause deflection thereof relative to the output of the nozzle 44. As the stream of nozzle 43 is deflected from alignment with the output of the nozzle 44, its effective strength is reduced and the output signal will move to the left and thereby from the collector 47 thereby reducing the output pressure signal.

The transverse or signal nozzle 51 is connected to the line 42 which, in turn, is connected to the aspirating nozzle 41.

With the valve 50 set to exhaust the collector 47, the bellows 34 will retract to establish maximum spacing of the nozzle means from the drum 31. A maximum gap and flow is therefore established with a minimal back pressure. This results in maximum aspiration in the line 42 thereby diverting the control signal stream from the nozzle 51 and, in effect, reducing the pressure signal to the nozzle 51. As a result, the streams of nozzles 43 and 44 will be in alignment and the output will be within the collector 44. This will establish a maximum output pressure within the collector 44 which, however, is exhausted via the check valve 49 and valve 50. When a reading or control is to be established, valve 50 is actuated to close valve 49, thereby transmitting a maximum pressure signal to the bellows 34. The bellows therefore moves downwardly toward the surface. As it moves downwardly, however, the free stream gap is reduced and the back pressure of stream 40 increases. This reduces the flow and the aspiration at nozzle 41. In the illustrated embodiment, a pressure signal and flow is then created in line 42 which is applied to the transverse impact nozzle 51. Consequently, the stream provides a deflection of the stream of nozzle 43 relative to that of nozzle 44 and the impact position will move laterally and outwardly of the collector 47. This, in turn, reduces the pressure signal in line 48 and allows bellows 34 to retract. In this manner, a balanced condition is established between the sensing assembly and the spiral surface 32 and the drum 31.

If the drum 31 now rotates, this balanced condition will be upset resulting in a similar imbalance of the signal to the transverse nozzle 51. Amplifier 36 inverts the pressure signal relationship to reposition the bellows 34 and the nozzle assembly 33 to maintain the desired average spacing distance.

The changes are also reflected in the strip chart or other recording device 37 and thus provide a direct indication of the distance between the nozzle 41 and the drum surface 32. By providing a drum radius which is proportional to the angle of the drum, the output pressure is also proportional to the angular position of the drum 31.

Thus, the embodiment of FIG. 2 essentially operates in the same manner as that of FIG. 1 to provide an essentially non-contacting engagement of a surface to maintain or detect the position thereof. The embodiment of FIG. 2 maintains the advantages of the embodiment of FIG. 1 including minimal loading of the surface, rapid response and the like. The embodiment of FIG. 2 further illustrates the versatility of the concepts of the present invention employing an aspirating-type sensing device and a transverse impact modulator.

Figure 3:
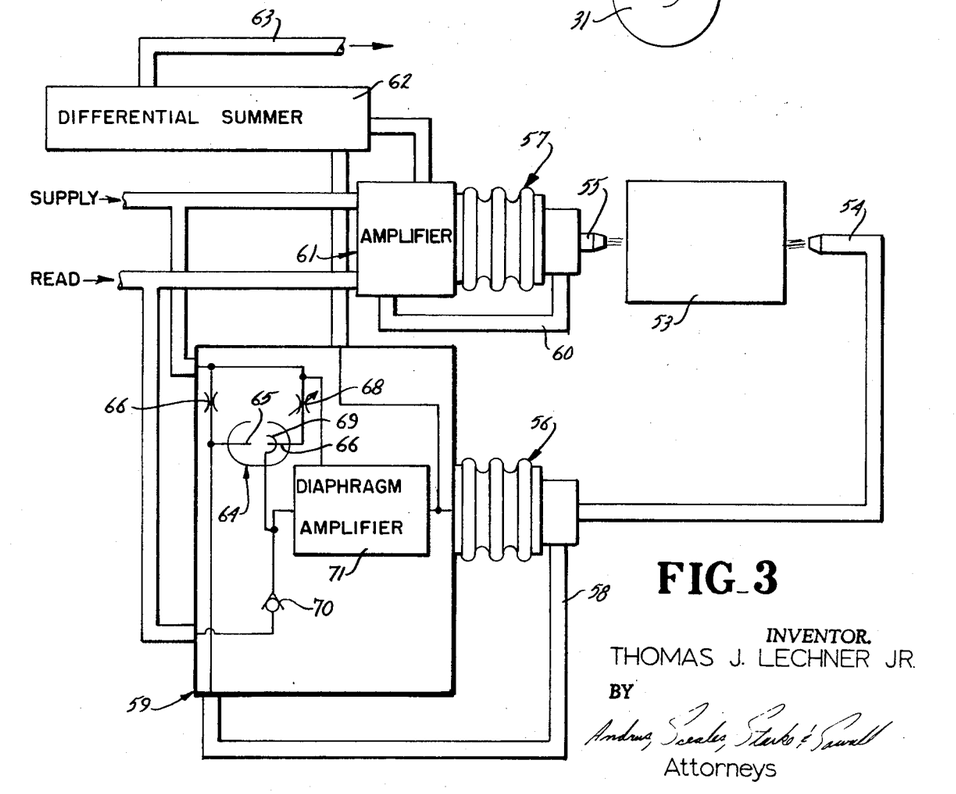
FIG. 3 is a fluidic sensing device constructed in accordance with the present invention for detecting the thickness or width of an element.

In addition to transversing of a surface to determine or follow a surface configuration, the concept may be employed directly as a thickness-sensing device or the like, such as shown in FIG. 3.

Referring particularly to FIG. 3, an object 53 is shown, the thickness of which it is desired to determine. For example, it might be desired to determine the gauge or thickness of the member, a moving web or the like. The object 53 is located between a pair of nozzles 54 and 55. The nozzle 54 is connected and carried by a bellows unit 56 which is supported in suitable fixed relationship with respect to the sensed part 53. The nozzle 55 is similarly connected to a bellows 57. The sensing nozzle 54 is a back pressure sensing unit similar to that shown in FIG. 1 and is interconnected to a supply line 58 in common with a suitable fluidic amplifier 59. The nozzle 55 is similarly connected to the back pressure signal line 60 which is interconnected to a corresponding fluidic amplifier 61. The output of amplifier 59 is directly and amplifier 61 is indirectly proportional to the gap between the respective nozzles 54 and 55 and the opposed surfaces of the object 53. The two output signals of the amplifiers 59 and 61 are connected as the two inputs to a differential or fluidic difference summer 62 which produces a fluid output signal at line 63 which is equal to the difference between the output of the amplifier 59 and the output of the amplifier 61. The output of summer 62 is, therefore, directly proportional to the thickness and width of the member 53 located between the nozzles 54 and 55.

Amplifiers 59 and 61 may be similarly constructed except to produce the opposite outputs for corresponding inputs as noted above and only amplifier 59 is shown in detail. Further, amplifier 59 is shown as a low pressure sensing amplifier which permits use of relatively low sensing pressures. Thus, the illustrated amplifier 59 will permit operating with sensor pressures in the range of 2 to 5 inches of water. The previous circuits of FIGS. 1 and 2 will generally be employed with pressures in the range of 3 to 10 pounds per square inch.

In particular, the fluid amplifier 59 includes a summing impact modulator 65 having an independent nozzle 64 connected to the supply through a suitable restrictor 66 and to the sensor line 58. The opposed dependent nozzle 67 is connected to the supply through a variable restrictor 68. The output collector 69 is provided adjacent the nozzle 66 and is interconnected through a check valve 70 to a read input means. The collector 69 is also connected as an input to a diaphragm amplifier 71 which is also connected to the supply.

Diaphragm-type fluid amplifiers 71 are well-known devices and no further description thereof is given or shown. The output of the amplifier 71 is a relatively high pressure signal which can be interconnected to directly drive a suitable load device including the bellows 56 and the differential transmitter 62 and the like.

Assume the gap between object 53 and nozzle 54 is reduced for purposes of discussion. The back pressure in the nozzle unit 56 and line 58 increases. This increases the strength of the stream from nozzle 65 and the impact position moves toward the collector 69 with a corresponding error signal which is further amplified by amplifier 71. The increased output pressure expands the bellows unit 56 and repositions the nozzle 54 to reestablish a selected gap. The amplifier 61 would be similar to amplifier 59 except the collector 69 would be positioned adjacent nozzle 65 and the impact position would be shifted to the left by proper supply to nozzle 66 relative to nozzle 65. Thus, as the gap adjacent nozzle 55 is reduced, the increased back pressure must reduce the signal to bellows unit 57 to retract nozzle 55. Reference to the illustrated impact modulator 64 shows that the amplifier 61 will so function with a collector 68 adjacent nozzle 65.

In summary, the nozzles 54 and 55 establish the sensing streams which, in turn, produce back pressure signals directly proportional to the gap between the nozzles and the adjacent surfaces of the object 53. The back pressure signals are transmitted to the amplifiers 59 and 61, each of which produces an output to reposition the associated bellows 56 and 57 to maintain an average spacing of the nozzles from the object 53. A corresponding pair of signals are impressed upon the differential summer 62 and the output signal at line 63 of differential summer 62 is proportional to the thickness or width of the object.

Figure 4:
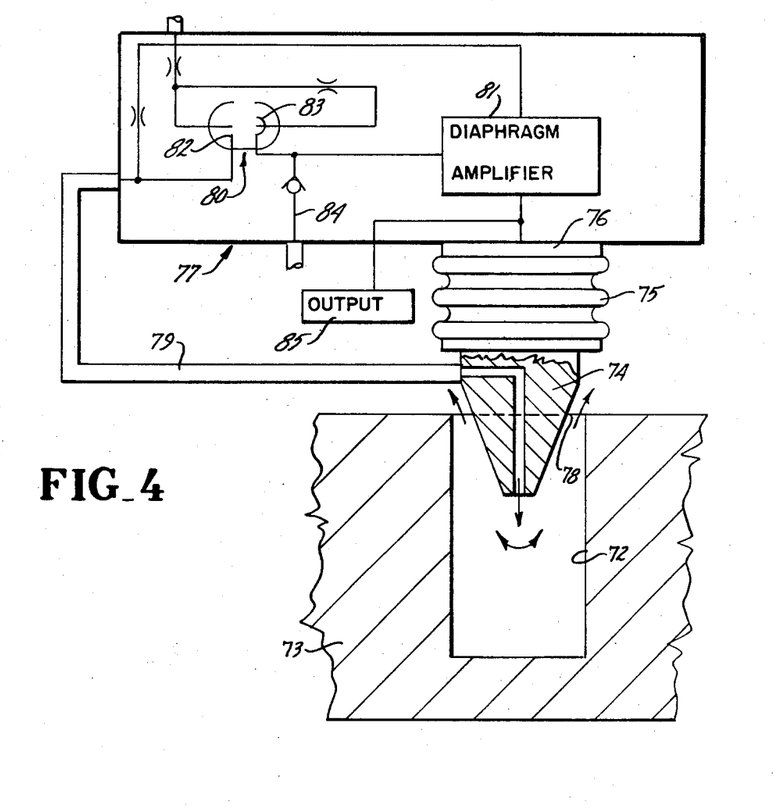
FIG. 4 is a non-contacting blind hole gauge device constructed in accordance with the present invention and employing an ultralow sensing pressure level.

A further embodiment of the invention is shown in FIG. 4 constructed to determine the diameter of a hole or recess 72 in an object 73. In this embodiment of the invention, a nozzle 74 is located to project into the hole 72. The nozzle 74 is carried by a bellows 75 or other suitable motor means on a fixed support 76 which is shown supporting an amplifying unit 77 for controlling the positioning of the bellows 75. The nozzle 74 is generally a cone-shaped nozzle which projects downwardly into the opening 72 such that a gap 78 between the edge of the opening 72 and the adjacent aligned coplanar portion of the nozzle 74 is directly proportional to the relative axial positions of the nozzle and opening. The nozzle 74 establishes a fluid pressure and flow within the opening 72 which exists through the gap 78 about the nozzle 74. The size of the exit gap 70 will, therefore, directly relate to and control the back pressure in the nozzle and produce a back pressure signal at a line 79. This signal is connected into a suitable amplifier 77 to provide a direct indication of the size of the gap and therefore the size of the opening.

In the embodiment of the invention shown in FIG. 4, the fluid amplifier 77 is shown as a combination of a transverse impact modulator 80 and a diaphragm amplifier 81. The high gain of the combination permits use of ultralow sensing pressure levels and is particularly suited to detection of the gap size to a high degree of accuracy. The transverse impact modulator 80 is similar to that shown in FIG. 2 and includes a transverse signal nozzle 82 connected to the line 79. The main nozzles and the signal nozzles are interconnected to the fluid supply generally as shown in FIG. 2. A collector 83 is connected adjacent the dependent nozzle and interconnected to the diaphragm amplifier 81 and a low pressure read branch 84 similar to those previously described. The output of the diaphragm amplifier 81 is connected to control the bellows 75 and also to a suitable readout means 85 to record the dimensional relationship of the opening. The extremely high gain of the transverse impact modulator in combination with the further amplification provided by the diaphragm amplifier 80 permits the use of ultralow sensing pressure levels such as in the range of .02 inches of water.

Otherwise, the illustrated embodiment of the invention operates in accordance with the teaching and principles of the previous embodiments.

Figure 5:
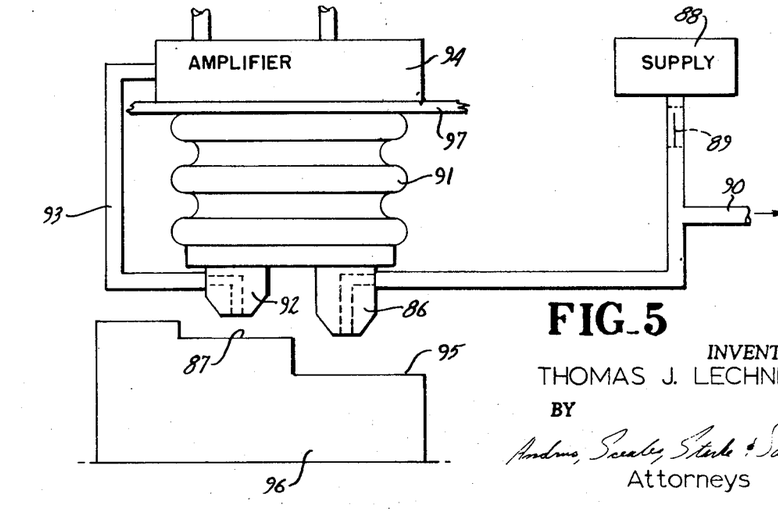
FIG. 5 is a similar diagrammatic view illustrating the present invention applied to the continuous positioning of a conventional back pressure sensing means.

To illustrate a further application of the present invention, the present invention is shown plane FIG. 5 applied to continuously reposition a conventional back pressure sensor unit 86 and, in particular, to maintain the back pressure sensor unit located accurately with respect to the plane of a reference surface 87.

Referring particularly to FIG. 5, back pressure sensor 86 is connected to a suitable pressure supply 88 in series with an orifice 89. The output pressure line 90 is connected directly to the back pressure sensor nozzle 86. In accordance with the illustrated embodiment of the invention, the back pressure sensor 86 is secured to a bellows 91 forming a part of a position control assembly constructed in accordance with the present invention. A sensing nozzle 92 is also secured to the bellows 91 and aligned with the surface 87. The nozzle 92 is connected via a line 93 to the input of a negative gain pressure amplifier 94, such as previously shown. In the construction of the apparatus, the two back pressure sensors 86 and 92 are attached to the bellows 91 with discharge ends of the nozzles accurately located with respect to each other and therefore accurately located with respect to the reference surface 87. The sensing nozzle 92 establishes a signal which holds nozzle 92 accurately spaced in accordance with a selected gap length such that the position of the nozzle 86 is at a particular precise location with respect to surface 87. The output of the back pressure sensor 86 then provides a measurement of the distance of the sensor from an aligned surface 95. Sensed surfaces 87 and 95 need not be parallel to each other. The reference surface 87 may be provided on a separate sensing fixture located in fixed relationship with respect to the sensing unit mounting or, as shown in FIG. 5, may be an accurately measured surface on a part 96 having surface 95. The output of the position-sensing device in this last embodiment of the invention is employed to merely position the bellows and thereby maintain the conventional back pressure sensor 86 in an accurate position with respect to reference surface 87. If desired, the output of amplifier 94 is a direct measurement of the distance between the surfaces 87 and the reference surface of the bellows and may, of course, be employed and interconnected to drive any suitable means.

It is to be understood that the back pressure sensor 86 of FIG. 5 carried by the positioning mechanism shown as bellows 91 can be replaced with a tool, not shown, such as a welding rod, cutting tool, etc. for performing work on part 96.

Although shown in a three-dimensional configuration, the sensing apparatus may employ a two-dimensional construction. Further, the illustrated back pressure nozzles may be any suitable fluid signal forming means which produce a fluid condition between the means and the surface which is related to the spacing therebetween.

Thus, the present invention provides an essentially non-contacting position sensing device which can be employed to establish various control and recording functions in either an open or closed loop system. The invention has been shown in a number of different applications and fluid circuit configurations to indicate certain aspects of the invention. Such illustrations are not, of course, limiting and the device can be employed in any application where it is desired to detect a surface and in which the surface can be engaged by a relatively low-loading fluid signal such as may be employed in the present invention. As previously noted, by proper construction of the repositioning drive means, a linear response is established to provide accurate tracking of the position of the fluid stream-engaged surface. Further, in the illustrated embodiments of the invention, the fluidic input control provides a very convenient and reliable means to selectively retract the sensing unit upon demand. This provides a very convenient means for manual or automatic manipulation of the work parts and the like and thus adapts the concept of the present invention to the commercial production line techniques.

Various modes of carrying out the invention are contemplated as being within the scope of the following claims which particularly point out and distinctly claim the subject matter which is regarded as the invention.

I claim:

1. A positional sensing apparatus for determining the position of a surface located adjacent the apparatus, comprising a fluid source means mounted in spaced relation to the surface and establishing a fluid signal means engaging said surface and having output means establishing an error signal in accordance with a characteristic of the fluid signal means, said characteristic of the fluid signal means being related to the distance between the fluid source means and the surface, a fluidic amplifier means having fluid input signal means connected to said output means of said fluid source means and an amplifier output means establishing a corresponding amplified fluid output operating signal, a linear fluid motor means attached to the fluid source means and having an input connected to the output of the amplifier means to establish a closed loop positioning system to maintain said movement of the source means within the linear characteristic of said motor means.

2. The positional sensing apparatus of claim 1 wherein there is also provided a fluid driven load connected to said amplifier output means for providing indication, recording or control functions.

3. The sensing apparatus of claim 1 wherein said fluidic amplifier means includes an impacting stream modulator having a control input connected to said output means of said fluid source means and establishing an amplified fluid control signal.

4. The fluid sensing apparatus of claim 1 wherein said fluidic amplifier includes an impacting stream modulator having a control input connected to said output means of said fluid source means and a diaphragm amplifier connected to the modulator and establishing said amplified fluid control signal.

5. The sensing apparatus of claim 1 wherein said fluid motor means is a linear capsule unit.

6. The sensing apparatus of claim 1 wherein said fluid motor means is a bellows having a movable end wall, said fluid source means being attached to said movable end wall.

7. The fluidic sensing apparatus of claim 1 wherein said fluid motor means is of the expandable type having spring means biasing the motor means to a retracted position and connected to said amplifier output means for expanding in proportion to said error signal input, said motor means being retracted by said spring means under conditions where said amplifier output signal is absent.

8. The positional sensing apparatus of claim 1 having means to move said fluid source means relative to the surface to continuously track the configuration of such surface.

9. The sensing apparatus of claim 1 wherein said fluidic amplifier means includes a transverse impacting stream having a transverse input nozzle connected to the output means of the fluid source means and establishing an amplified fluid control signal in proportion to said error signal, and said position control means includes a fluid motor drive means connected to the output means of the fluid source means and establishing an amplified fluid control signal in proportion to said error signal, and said position control means includes a fluid motor drive means connected to the fluid source means and positioning the fluid source means in proportion to said control signal and in a direction to reduce said error signal.

10. The fluid sensing apparatus of claim 1 wherein said fluid source means includes a pair of aligned axially-spaced orifices defining an aspiration chamber therebetween, and said fluidic amplifying means has an input connected to said aspiration chamber and an output connected to said positioning means.

11. The positional sensing apparatus of claim 1 wherein said fluid source means includes a nozzle having a tapered surface, said positioning means moving said fluid source means in a direction normal to said surface.

12. The positional sensing apparatus of claim 1 for determining the size of an opening to a chamber, wherein said fluid source means includes a conical nozzle adapted to move through said opening and establishing a stream within said opening, an amplifying and control means connected to said fluid source means and coupled to position said nozzle within said opening, and a signal-detecting means coupled to said control means to record the relative strength of said signal and detect the size of the opening.

13. The positional sensing apparatus of claim 1 wherein a tool is secured to said positioning means in common with said fluid source means to maintain said tool in a selected predetermined relationship relative to said fluid source means and thereby to said surface.

14. The positional sensing apparatus of claim 1 including a back pressure sensing means secured to said positioning means in common with said fluid source means to maintain said back pressure sensing means in a selected predetermined relationship relative to said fluid source means.

15. The positional sensing apparatus of claim 14 wherein said positioning control means includes a moving wall, and said fluid source means and said back pressure sensing means each include a nozzle secured to said wall, said nozzles being disposed in a predetermined relationship one to the other.

16. A positional sensing apparatus for sensing a position of an object located adjacent the apparatus, comprising a fluid stream-forming means adapted to be connected to a fluid supply and establishing a pressurized free fluid stream engaging said surface, fluid amplifying means connected to said fluid stream-forming means upstream of said free stream and establishing an amplified fluid error signal in accordance with a power characteristic of the stream, said characteristic of the stream being directly related to the distance between the fluid stream-forming means and the object, and a fluid actuated position control means having a linear response region and connected to the output of the fluid amplifying means and attached to said fluid stream-forming means to means in accordance with said error signal and thereby maintain a predetermined essentially constant gap between said fluid stream-forming means and said surface with said control means operating within said linear response region.

17. The positional sensing apparatus of claim 16 wherein said fluid stream-forming means establishes a straight jet stream directed toward said surface and establishing a back pressure signal proportional to the distance between the surfaces and the stream-forming means.

18. The fluid sensing apparatus of claim 17 to determine the spacing of a second surface from said first surface, having a second fluid stream-forming means establishing a second jet stream in opposed parallel relationship to the first jet stream and establishing a corresponding back pressure in accordance with the spacing from the second surface, a second position control means connected to the output of the second stream-forming means by a second fluid amplifying means to position said second stream-forming means, and a differential signal detecting means coupled to said sensor signal means for providing the relative strength of said error signals and detecting the distance between the opposite surfaces engaged by the two sensing streams.

19. The fluid sensing apparatus of claim 18 wherein said position control means each includes an expandable fluid motor means mounted in a predetermined position, one relative to the other for providing said opposed parallel streams by said stream-forming means being coupled to the corresponding motor means, and one of said amplifying means including means to invert the input signal whereby corresponding error signals drive the motor means in opposite directions.

* * * * *

UNITED STATES PATENT OFFICE
CERTIFICATE OF CORRECTION

Patent No. 3,682,191            Dated   August 8, 1972

Inventor(s)  THOMAS J. LECHNER, JR.

It is certified that error appears in the above-identified patent and that said Letters Patent are hereby corrected as shown below:

Column    8,    Line    42,    cancel "fist" and insert

--- first ---;

Column   15,    Line    18,    after "to" insert ---
    CLAIM 16 continuously position the fluid stream-forming ---.

Signed and sealed this 20th day of March 1973.

(SEAL)
Attest:

EDWARD M.FLETCHER,JR.              ROBERT GOTTSCHALK
Attesting Officer                  Commissioner of Patents